United States Patent Office 3,181,714
Patented May 4, 1965

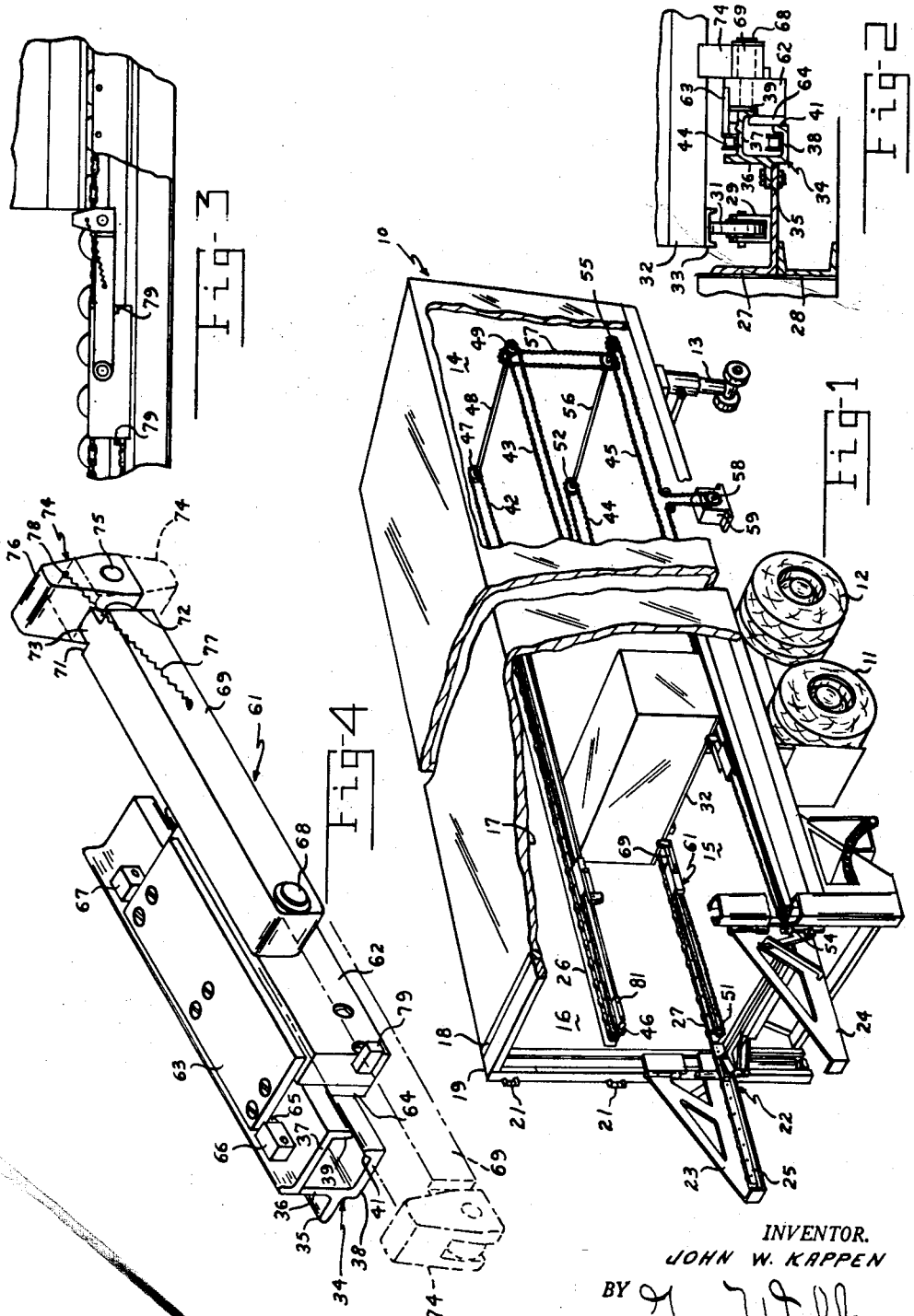

3,181,714
MATERIAL HANDLING APPARATUS
John W. Kappen, 243 Kenwood Ave., Dayton, Ohio;
Frieda E. Kappen, administratrix of the estate of John
W. Kappen, deceased
Filed Sept. 7, 1962, Ser. No. 222,091
8 Claims. (Cl. 214—16.4)

This invention relates to material handling apparatus, particularly as used in storage compartments for the facile storing and removal of loaded pallets. Although not so limited, the invention has special reference to trailer trucks having rails slidingly supporting pallets, the invention providing an improved means for the accurate, simplified positioning of pallets in the trailer interior as well as an improved means for achieving a powered movement of the pallets into the trailer compartment for storage and out of the storage compartment for removal.

The object of the invention is to provide means facilitating the introduction of loaded pallets to a storage compartment and their removal therefrom which may be economically manufactured, efficient and satisfactory in use, adaptable to a wide variety of applications, and unlikely to malfunction.

A further object of the invention is to equip a trailer body of like means with improved apparatus for introducing loaded pallets thereto and removing such pallets therefrom.

Another object of the invention is to provide improved means for powered movement of pallets to and from a storage compartment.

A further object of the invention is to provide novel carriage means for application to a storage compartment adapted selectively to be made effective and ineffective to selectively propel pallets either into or out of the storage compartment.

A further object of the invention is to provide a material handling apparatus possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinaions thereof, and the mode of operation as hereinafter described or illustrated in the accompanying drawings, or their equivalents.

Referring to the accompanying drawings, wherein is shown one but obviously not necessarily the only form of embodiment of the invention.

FIG. 1 is a view in perspective, partly broken away and in part diagrammatic, showing a trailer truck equipped to carry out the object of the instant invention, showing an illustrative embodiment of the invention;

FIG. 2 is a detail view, showing mounting and propelling means for one end of a pallet in accordance with the illustrated embodiment of the invention.

FIG. 3 is a detail, fragmentary view in side elevation of apparatus seen in FIG. 2; and FIG. 4 is a detail view, enlarged with respect to FIGS. 1, 2 and 3, showing in perspective a carriage device forming a part of the actuating means.

Like parts are indicated by similar characters of reference throughout the several views.

Referring to the drawings, the invention is illustratively disclosed in a trailer truck body adapted for the transportation of loaded pallets. As indicated, however, the invention has general utility in storage compartments and the like wherein the positioning and movement of material handling devices such as pallets may serve a useful purpose.

A trailer truck in accordance with the illustrated embodiment of the invention comprises a body 10 mounted upon a suitable under carriage which may include sets of wheels 11 and 12 and a rest or foot 13. The body 10 provides an interior storage compartment 14 having a floor 15, side walls 16, and a ceiling 17. One end of the compartment is closed. The other, or outer, end is open and defined by marginal strip means 18. Secured to the strip 18 is an angular frame assembly 19 having hinge fixtures 21 whereby doors may be mounted in position to close the said outer end of the storage compartment.

The frame 19 also provides a mounting for elevator apparatus 22 comprising in part projecting arms 23 and 24 having anti-friction means 25 thereon. The arms 23 and 24 cooperate to provide support for respective ends of a pallet, the pallet being adapted to rest on the anti-friction devices 25 and to be slid freely on such devices in moving a pallet into or out of the compartment 14. By vertical adjustment of the elevator apparatus 22 of which they are a part, the arms 23 and 24 are adapted selectively to be aligned at different transverse levels of the compartment 14 as defined by vertically spaced apart sets of rails 26 and 27. There is a pair of rails 26, extending longitudinally along each side wall 16, and a like pair of similarly arranged rails 27. The rails 26 and 27 are stationarily mounted to the body 10 and are suitably held and supported as by being mounted on longitudinally extending bracket means 28 (FIG. 2). Each rail on its upper surface has a U-shaped channel member 29 mounting anti-friction rollers 31. These are adapted, as shown, to support one end of a pallet 32 the latter having in the illustrated instance a rib member 33 on its underside directly contacting the rollers 31. The rail means of cooperating pairs engage and support opposite ends of a pallet which is thus in effect suspended by its ends within the storage compartment and is freely movable therein in a longitudinal sense by reason of the rolling mounting provided by rollers 31.

In accordance with the instant invention each rail 26 and each rail 27 has a transverse extension in the form of a track 34. The track is suitably secured to its respective rail, as by being bolted thereto through a flange 35. The flange 35 projects from an upstanding wall portion 36 of the track 34. Projecting in the opposite direction therefrom and in vertically spaced relation are horizontal wall portions 37 and 38, the former being somewhat longer than the latter and both terminating in respective turned over lips or flanges 39 and 41. The wall portions 37 and 38 serve to guide and to support upper and lower flights of a respective one of a plurality of continuous chains 42–45. The chains are arranged in upper and lower pairs 42–43 and 44–45 corresponding to the pairs of rails 26 and 27. Chain 42 encompasses sprocket wheels 46 and 47, the latter on a shaft 48 to which also is secured a sprocket wheel 49 representing one of the corresponding sprocket wheels over which chain 43 is passed. The chain 44 similarly stretches over sprocket wheels 51 and 52 while chain 43 similarly runs over sprocket wheels 54 and 55. A shaft 56 interconnects the lower level sprocket wheels 52 and 55 while a driven connection is established from shaft 56 to shaft 48 by chain and sprocket means including a chain 57. The lower flight of chain 45 is looped to encompass a sprocket wheel 58 forming a part of rotary motor means 59 suspended from the underside of body 10. In response to operation of the motor 59, therefore, chain 45 is caused to travel over sprocket wheels 54 and 55, and, at the same time, as will be seen, to effect a simultaneous movement of the chains 42, 43 and 44.

The several chains 42–45 are, as noted, guided by respective tracks 34, the sprocket wheels for the individual chains being so located and mounted within the body 10 as to place upper and lower flights of the chains in cooperative relation with track portions 37 and 38 in the manner indicated in FIG. 2 hereof. Each chain includes in its length a carriage device 61 slidingly engaged with a respective track 34. Each device 61 comprises a body portion 62 on the top of which is a plate 63 offset to project in overlaying relation to the upper horizontal portion 37 of the track 34. At the bottom of body portion 62 is an inwardly offset flange portion 64 adapted to make sliding contact with the turned over lip 41 of horizontal portion 38 and to extend upwardly into overlapping relation to the turned over lip 39 of portion 37. The arrangement is one to achieve an interfitting relationship of the device 61 with the track 34 whereby the device 61 may be slid longitudinally of the track and be guided and supported thereby. The offset projecting portion of plate 63 has a strip 65 secured to the underside thereof and terminating at its opposite ends in blocks 66 and 67. These serve as points of attachment for opposite ends of a respective chain, the chain being in effect interrupted along its length to have the carriage device 62 interposed therein.

Intermediate the ends of the body 62 a stub shaft 68 is installed and provides a pivotal mounting for a pawl arm 69. The latter is a relatively elongated member lying parallel to and adjacent to the body 62 and connected to the stub shaft 68 at its one end. Its opposite end is cut away at the margins to define laterally spaced apart recessed shoulders 71 and 72 and a central projecting tongue 73. A pawl element 74 has a slotted base fitting over the tongue 73 and pivotally connected thereto as through pivot stud means 75. The pawl element has a height exceeding the height of arm 69, a tapering finger portion 76 thereof rising above the plane of arm 69 when the pawl element occupies a position substantially at right angles to the arm as indicated in FIG. 4. The pawl element is urged to such an upright or perpendicular position by a spring 77 anchored at its one end to the arm 69 and connected at its other end to a pin 78 offset from the pivot stud 75 toward the extremity of finger portion 76. The arrangement accordingly is one to urge the pawl element 74 in a rocking motion about pivot stud 75, which motion is limited by engagement of the pawl with shoulders 71 and 72. Further, the arrangement is one permitting the pawl element to be swung or rocked a distance of about 180° about pivot stud 75 to a dotted line position as shown in FIG. 4 at which time the spring 77 continues to urge the pawl to a position generally perpendicular to arm 69, this time, however, with the pawl projecting below the plane of arm 69.

The pawl element 74 accordingly has alternate positions of adjustment, as shown respectively in full and dotted lines in FIG. 4. The arm 69 likewise has alternate positions of adjustment similarly approximately 180° distant from one another. Thus at each end of the body 62 is a laterally projecting abutment member 79. The arm 69 is adapted to be swung on its pivot 68 to alternate positions of rest upon these abutment members, and, when so positioned, lies within the plane of the carriage device of which it is a part. Adapted to project upwardly of this plane is the pawl element 74. The carriage device proper is located and constructed to pass beneath the supported pallets 32, as indicated in FIG. 2. Pawl element 74, however, rises in the path or plane of the pallets and is designed to make contact with the pallets for propelling it in accompaniment with travel of the carriage means. Each carriage device is made selectively effective and ineffective with respect to supported pallets by adjustment either of the pawl element 74 or of the arm 69 upon which it is mounted. In FIG. 1 the lower set of carriage devices 61 have their arms 69 and pawl elements 74 adjusted to apply a rearwardly directed thrust to a loaded pallet. Should the arms be swung to their alternate position, as in the case of the upper carriage device shown in FIG. 1, then the arm and attached pawl element becomes ineffective to engage an overlying pallet since the pawl element is at this time directed downwardly or away from the pallet. A like result could be achieved by allowing the arm 69 to remain in the position of the lower carriage devices but rocking the individual pawl elements downward about their pivot studs 75 to the dotted line position as shown in FIG. 4. In this instance also the arms and associated pawls are allowed to pass freely under a supported pallet and are ineffective to engage and move the pallet.

In the use of the material handling apparatus of the invention loaded pallets are suitably introduced into the storage compartment 14 as through use of the elevator arms 23–24 and positioned upon a set of rails 26 or 27. The outwardly facing edge of the pallet then is engaged by the carriage devices 61, positioned as in the lower devices shown in FIG. 1, and, upon rearward movement of such carriage devices, the loaded pallet is propelled rearwardly or inwardly of the storage compartment to a selected location therein, this process being repeated with respect to introduced pallets until the storing operation is complete.

The carriage devices have a reciprocating motion within the storage compartment, the motor 59 being driven first in one direction to cause the carriage devices to advance into the compartment 14 toward the rear thereof and then driven in the opposite direction to retract the carriages toward the open front end of the compartment. In removing the pallets from the compartment, the pawl arms 69 are rocked to the alternate position of adjustment therein shown in dotted lines in FIG. 4, and, as indicated, the pawl elements 74 are rocked to their alternate positions of adjustment, placing the finger portions 76 thereof in an upright projecting position. The carriage devices are in this manner conditioned to engage opposite edges of the loaded pallets and to propel them toward the open front end of the storage compartment 14 as a part of the retracting motions of the carriage devices. The yield introduced by the springs 74 is utilized in this operation to permit the pawl element to be cammed downwardly as the carriage devices pass beneath the selected pallet as they move to the rear on the advance or forward stroke. After passing beneath the pallet the pawl elements spring up to resume their upright position and thereby are conditioned for propelling the pallet as described. Advancing and retracting motions of the carriage devices accordingly are selectively used to store and to remove pallets, and when desired, the carriage devices are made ineffective with respect to the pallets. The latter adjustment may be desired, for example, when loading of a lower tier of pallets on rails 27 has been completed and the loading of an upper tier on rails 26 is begun. Inasmuch as the several carriage devices move simultaneously the lower set is at this time made ineffective in order not to interfere with freedom of movement of the upper set. Limits of advancing and retracting motions of the carriage devices may be defined by stationary stops 81 (one shown).

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and modes of putting the invention into effect, and the invention is therefore claimed in any of its forms or modifications within the legitimate and valid scope of the appended claims.

Having thus described my invention, I claim:

1. In a storage compartment, longitudinally movable conveyor means in said compartment, a plurality of laterally spaced apart carriage devices incorporated in and moving with said conveyor means, adjustable pawl means on each of said devices, pallet supports in said compartment arranged in conjunction with said conveyor means to support pallets for movement thereover by engagement of said pawl means with said pallets, said pawl means being adjustable to engaging and nonengaging positions relative to supported pallets, said pawl means including a pivotally adjustable arm having an upstanding pawl element thereon, said arm in one position of pivotal adjustment presenting said pawl element for engagement with a supported pallet and in another position of pivotal adjustment moving said coveyor means in by-passing relation to the pallets, said pawl element being angularly adjustable relative to said arm in either adjusted position of said arm.

2. In a storage compartment having an elongated interior and open at one end, a rail means installed in said compartment along sides thereof to support pallets for relative sliding motion from said open end of the compartment inwardly of said interior for storage and for return motion to said open end for removal, carriage means reciprocable in said compartment and including at least one pawl arm adapted to pass in underlying relation to a supported pallet, means on said carriage means defining alternate positions of adjustment for said arm, and projecting pawl means on said arm operable in one position of said arm to utilize motion of the carriage means in one direction to engage and move a supported pallet inwardly of said compartment for storage and operable in the other position of the arm to utilize motion of the carriage means in the other direction to engage and move a supported pallet outwardly of said compartment to said open end for removal, said pawl means being pivotally connected to said arm and biased to a relatively projecting poition whereby to yield for by-passing of pallets during travel of said carriage means in a direction opposed to that selected to be utilized by the setting of said arm.

3. Apparatus according to claim 2, characterized in that said pawl means comprises a single pawl element adjustable to different angular positions relative to said arm, said carriage means being made ineffective relative to support pallets by an adjustment of said arm without a corresponding adjustment of said pawl element or vice versa.

4. Material handling apparatus, including a pair of laterally spaced apart longitudinally extending rails adapted slidingly to support pallets, longitudinally reciprocable carriage means adapted to pass in underlying relation to supported pallets, and pawl means on said carriage means settable selectively to utilize the motions of said carriage means to propel pallets in different directions on said rails, said pawl means including a pawl arm and a pawl individually pivotally adjustable whereby adjustment of either may render said pawl means ineffective to propel said pallets.

5. In a storage compartment having an elongated interior and open at one end, rail means installed in said compartment along sides thereof to support pallets for relative sliding motion from said open end of the compartment inwardly of said interior for storage and for return motion to said open end for removal, track means installed in said compartment in parallel relation to said rail means, carriage means interengaged with said track means and reciprocable lengthwise thereof in said compartment, a pawl arm pivotally connected at its one end to said carriage means at an intermediate location, said arm being adjustable through an arc of approximately 180° to porject the opposite end thereof selectively toward opposite ends of said compartment, means on said carriage means defining limits of arcuate turning motion of said arm, and projecting pawl means on said arm adapted to engage and move a supported pallet and rendered effective and ineffective by adjustment of said arm as described said pawl means comprises a pawl element pivotally connected to said opposite end of said arm to be adjustable through an arc of about 180° to lie in alternate positions at right angles to a horizontal plane passing through said arm, said element being pivoted to said arm near its one end and having a length to project the other end thereof relatively to said arm in both alternate positions.

6. In a storage compartment having an elongated interior and open at one end, rail means installed in said compartment along sides thereof to support pallets for relative sliding motion from said open end of the compartment inwardly of said interior for storage and for return motion to said open end for removal, track means installed in said compartment in parallel relation to said rail means, carriage means interengaged with said track means and reciprocable lengthwise thereof in said compartment, a pawl arm pivotally connected at its one end to said carriage means at an intermediate location, said arm being adjustable through an arc of approximately 180° to project the opposite end thereof selectively toward opposite ends of said compartment, means on said carriage means defining limits of arcuate turning motion of said arm, and projecting pawl means on said arm adapted to engage and move a supported pallet and rendered effective and ineffective by adjustment of said arm as described said pawl means comprises a pawl element pivotally connected to said opposite end of said arm to be adjustable through an arc of about 180° to lie in alternate positions at right angles to a horizontal plane passing through said arm, said element being connected to said arm near one end and having a length to project the other end thereof relatively to said arm in both alternate positions, and spring means attached to said arm and to said pawl element intermediate the ends thereof to hold said element yieldingly in either said position of adjustment.

7. In a storage compartment having an elongated interior and open at one end, rail means installed in said compartment along sides thereof to support pallets for relative sliding motion from said open end of the compartment inwardly of said interior for storage and for return motion to said open end for removal, a pallet being carried by said rail means in transverse relation to said compartment, track means mounted to said rail means and presenting overlying and underlying track surfaces, continuous conveyor means movable over said surfaces, carriage means comprised in said conveyor means and interengaged with said track means for relative sliding motion, said carriage means having a part overlying said overlying track surface to which ends of said conveyor means are connected, an arm pivotally connected to said carriage means and rotatable through an arc of about 180° to project selectively toward opposite ends of said compartment, and a pallet engaging pawl on one end of said arm projecting at right angles thereto in one direction only, rotary adjustment of said arm as described making said pawl alternately effective and ineffective to engage a pallet.

8. In a storage compartment having an elongated interior open at one end, rail means installed in said compartment along sides thereof to support pallets for relative sliding motion from said open end of the compartment inwardly of said interior for storage and for return motion to said open end for removal, track means installed in said compartment in operative association with said rail means, carriage means interengaged with said track means and reciprocal lengthwise thereof in said compartment, said carriage means being adapted to pass in underlying relation to pallets supported by said rail means, said carriage means being characterized by a pivotally connected pawl arm adjustable thereon through an arc of approximately 180° to selectively project towards each of the opposite ends of said compartment including said open end and pawl means connected to said arm arranged to project therefrom in respectively opposite directions, means pivoting said pawl means to the arm so that in either of the 180° apart positions of the arm, the pawl means may be pivoted relative thereto to an upward operative position or a downward inoperative position.

References Cited by the Examiner
UNITED STATES PATENTS

| | | | |
|---|---|---|---|
| 2,304,117 | 12/42 | Norbom | 214—516 |
| 2,442,549 | 6/48 | Pearlman | 214—518 |
| 2,521,727 | 9/50 | Kappen | 214—16.4 X |
| 2,591,153 | 4/52 | Hodges | 214—516 |
| 2,811,240 | 10/57 | Fenton | 214—514 X |

HUGO O. SCHULZ, *Primary Examiner.*

GERALD M. FORLENZA, *Examiner.*